Figures 1, 2, 3:
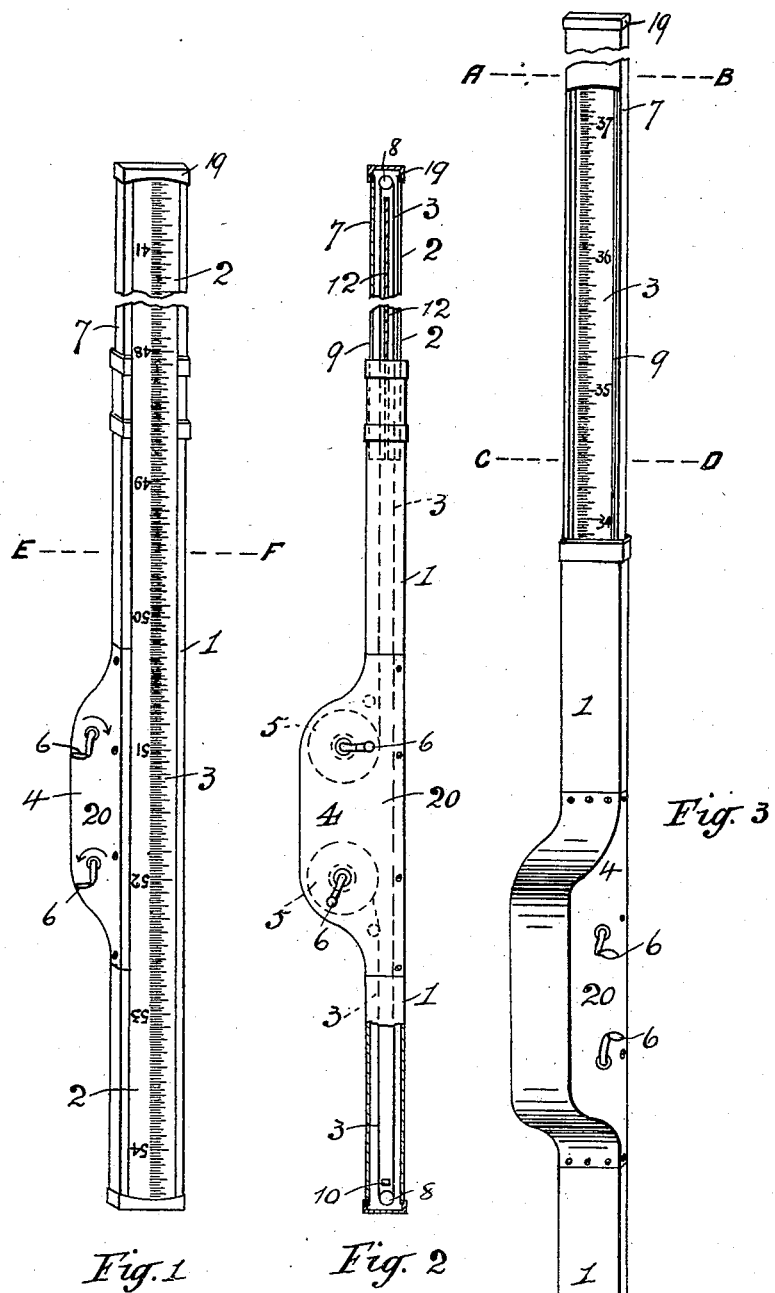

No. 886,354. PATENTED MAY 5, 1908.
W. F. DARLING.
LEVELING STAFF.
APPLICATION FILED SEPT. 11, 1906.

2 SHEETS—SHEET 1.

WITNESSES:
George G. Schoenlank
Frank H. Logan

INVENTOR,
WILLIAM FISHER DARLING,
BY
ATTORNEY.

No. 886,354. PATENTED MAY 5, 1908.
W. F. DARLING.
LEVELING STAFF.
APPLICATION FILED SEPT. 11, 1906.
2 SHEETS—SHEET 2.
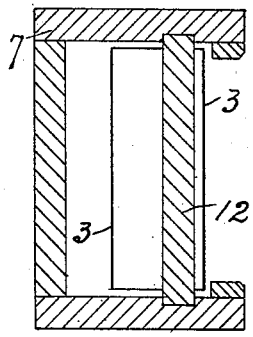
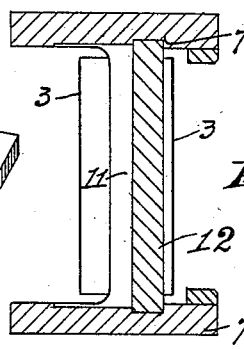
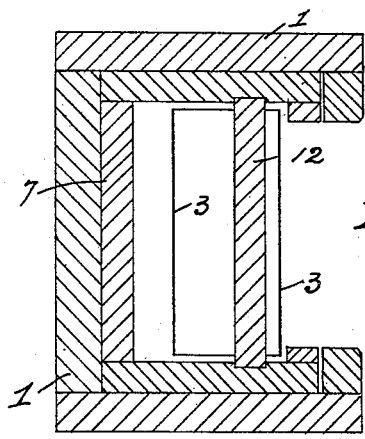
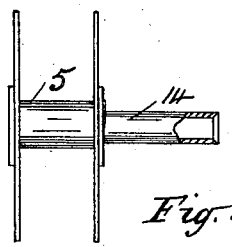
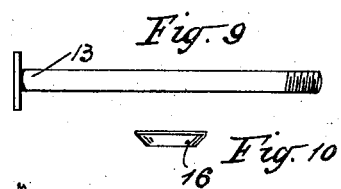
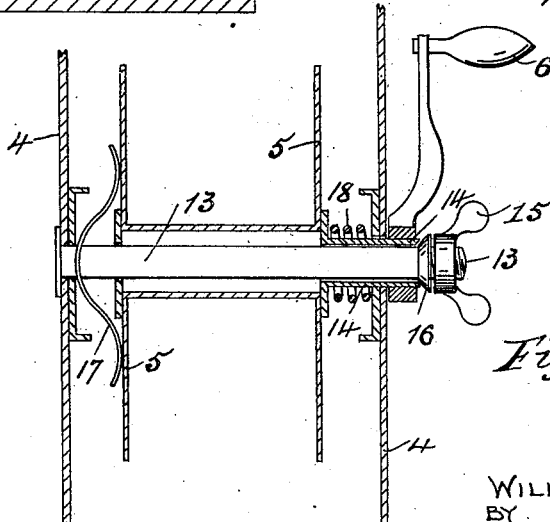
WITNESSES:
George G. Schoenlank
Frank H. Logan
INVENTOR,
WILLIAM FISHER DARLING,
BY
ATTORNEY.

UNITED STATES PATENT OFFICE.

WILLIAM FISHER DARLING, OF HOBART, TASMANIA, AUSTRALIA, ASSIGNOR OF ONE-THIRD TO SIDNEY THOMAS CHANCELLOR, OF HOBART, TASMANIA, AUSTRALIA.

LEVELING-STAFF.

No. 886,354.   Specification of Letters Patent.   Patented May 5, 1908.

Application filed September 11, 1906. Serial No. 334,116.

*To all whom it may concern:*

Be it known that I, WILLIAM FISHER DARLING, a subject of the King of Great Britain, residing at Hobart, Tasmania, Commonwealth of Australia, have invented a new and useful Improvement in and Relating to Leveling-Staves; and I do hereby declare the following to be a full, clear, and exact description of the same.

This invention relates to the leveling staff used by engineers, surveyors and others for taking ground levels, and consists in a special construction of staff having a movable scale whereby reduced levels may be obtained by direct reading from the same, thereby dispensing with the calculations by rise and fall columns which are necessary when the ordinary type of leveling staff is employed.

In carrying the invention into effect, I arrange in a leveling staff, so as to move longitudinally therein, a graduated tape, of a length slightly more than 100 feet or the equivalent in meter or other units of length. The tape is marked in scale in inverted numerical progression, and means are provided for causing the same to be moved up and down the staff, which is constructed so that the marks and figures upon the tape may be visible.

I will hereinafter explain the application of the invention in practice, and meanwhile will describe the same with reference to the accompanying drawings, in which, Figure 1 is a front and partly side view of a staff made according to this invention, shown broken off, for convenience in the drawing. Fig. 2 is a side view, partly in section, and Fig. 3 a rear view of same, each being conveniently broken. Fig. 4 is a sectional plan on the line A—B, Fig. 3. Fig. 5 is a similar view on line C—D, Fig. 3. Fig. 6 is a perspective view of a stiffening piece. Fig. 7 is a sectional plan on the line E—F, Fig. 1. Fig. 8 shows in elevation a reel and attached sleeve, partly in section. Fig. 9 is the spindle of same. Fig. 10 a beveled washer, and Fig. 11 shows in sectional side elevation one of the reels employed with the tape and means for locking same.

1 may represent the lower part of an ordinary staff having an opening 2 the entire length in front so that the tape 3 may be visible. Upon the said part 1 is a chamber or compartment 4 in which reels 5, 5, are mounted, as shown in dotted lines in Fig. 2. The reels are identical with each other and are rotated by handles 6, 6 for the purpose of moving the tape 3 up or down the staff.

Telescoping with the principal part 1, is the extension piece 7 also in front and in the upper end of said piece and the lower end of part 1 are small rollers 8, 8, which are mounted therein in such a way as to carry the tape 3.

Referring to Figs. 5 and 6, 11 is a metal support to give strength, which is placed at intervals in 7 in the open part 9 before mentioned. For the same purpose an internal plate or strut 12 runs for nearly the length of the piece 7, but instead of 11, light L shaped pieces may be used at intervals.

In order to lock the reels when the tape has been moved to the position required, means are provided which are illustrated in Figs. 8, 9, 10, and 11, in which 13, is a spindle that is rigidly held in the walls of the compartment 4. The reel 5 is adapted to revolve about spindle 13, and is provided with a projecting sleeve 14, which is long enough to pass through one side of the compartment while the spindle 13, also passes through the sleeve and likewise projects from the casing beyond the sleeve. Upon this sleeve the handle 6 is keyed, and a winged nut 15 or its equivalent is upon the end of the spindle. Behind the nut is a beveled washer 16, which takes into the end of the sleeve 14, that is counter sunk or chamfered to receive it.

In Figs. 1, 2, and 3, the handles 6, 6, are shown without the nuts 15, but it should be understood that same are to be used with the handles, and that the Fig. 11 is an enlarged view of one of the reels 5, said reels being identical.

For the purpose of preventing the reels from moving too freely, each is provided on one side with a friction disk or spring 17 and on the other side with a cushion spring 18. When the nut 15 is screwed up, the effect will be to press the washer 16 into and against the end of the sleeve 14, and to cause the rotatable sleeve and reel to be integral with the fixed and non-rotatable spindle 13.

The spring 18 which is of stronger construction than spring 17, will be useful in the case of the staff receiving a sudden sidewise jar, through a fall or other cause; in such a case the weight in the reel 5 would be taken on the cushion spring 18.

The cap 19 is removable for the purpose of drawing out the tape 3 should it be necessary to dry it after being used in wet weather; and the side 20 of the compartment 4 can be also unscrewed and removed to afford access to the reels for detaching tape, or for placing a new tape thereon.

The ordinary means may be used for retaining the piece 7 in its extended position in principal part 1, the whole staff, when provided with the improvements, being very similar in appearance to the ordinary leveling staff as at present used.

The tape 3 is marked in the same way as the scale upon leveling staves and may be made of any suitable material such as celluloid, canvas or light metal. It should be numbered from 1 to 114 in feet, the extra 14 feet being required to pass from the first hundred into the second and so on.

The improved staff is applied in taking reduced levels in the following manner: The staff is first placed on a bench mark or known point in the usual way. The engineer at the instrument then motions the staff holder to raise or lower the tape, by means of handle 6, until the reading becomes identical with the reduced level of the bench mark on which it is held. The reels are them clamped as hereinbefore explained, and the tape rendered a fixture for the time being. The staff may then be carried to any number of stations, where the readings taken will be the reduced levels of those stations. When the instrument is moved on to the next set up or "change" instead of booking down a "back sight" the tape 3 is again moved until it reads the exact level of that point at which it is held, and so on. Thus, by means of this invention, we have mechanical accuracy combined with a saving of time and trouble which will be readily understood and appreciated by those engaged in railway construction and kindred engineering surveys. After a day's work with this staff, the levels taken are immediately available without having to reduce them by rise and fall columns, which process has been proved by experience to be a frequent source of error. Thus, in setting out work, or in reproducing already designed levels on the ground, or in the mass of details necessary in designing a sewerage scheme, much tedious labor will be saved. As the figures on the staff necessarily run in inverted numerical progression, when viewed through the telescope, not only the figures but the progression will appear the right side up, the staff therefore looking exactly the same as an ordinary staff to the naked eye.

Having now described my invention what I claim as new and desire to secure by Letters Patent is:—

1. A leveling staff or rod comprising two hollow telescopically-connected sections open in front, a compartment on one of said sections and reels housed in said compartment, in combination with rolls fitted at the outer ends of each of the sections, and a graduated tape provided with a common sequence of figures, connected at its respective ends with said reels and passing over the rolls aforesaid, the whole arranged to permit desired manipulation of the tape irrespective of the length of the staff.

2. In a leveling staff, a compartment on the staff, reels in said compartment, a graduated tape attached at its respective ends to said reels, a stationary spindle supporting each reel which is rotatable thereon, a sleeve on the reel co-axially arranged therewith and projecting through the side of the compartment, a handle upon the sleeve, and a nut and a beveled washer upon the end of the stationary spindle, said washer taking into the chamfered end of the sleeve on the reel when the nut is screwed up, as and for the purposes set forth.

In testimony whereof, I have signed my name to this specification in the presence of two subscribing witnesses.

WILLIAM FISHER DARLING.

Witnesses:
P. M. NEWTON,
C. WEYMOUTH.